(12) United States Patent
Chrabieh

(10) Patent No.: US 8,446,967 B2
(45) Date of Patent: May 21, 2013

(54) PREAMBLE SEQUENCES FOR WIRELESS COMMUNICATION SYSTEMS

(75) Inventor: Rabih Chrabieh, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 1131 days.

(21) Appl. No.: 12/350,485

(22) Filed: Jan. 8, 2009

(65) Prior Publication Data

US 2010/0172423 A1 Jul. 8, 2010

(51) Int. Cl.
*H04L 27/28* (2006.01)
*H04L 27/00* (2006.01)
*H04L 27/06* (2006.01)

(52) U.S. Cl.
USPC ............. 375/260; 375/295; 375/343

(58) Field of Classification Search
USPC .......... 375/260; 455/59; 370/281, 295
See application file for complete search history.

(56) References Cited

U.S. PATENT DOCUMENTS

| | | | | |
|---|---|---|---|---|
| 8,223,783 B2 * | 7/2012 | Shorty et al. | | 370/406 |
| 2004/0179507 A1 * | 9/2004 | Batra et al. | | 370/343 |
| 2006/0159194 A1 * | 7/2006 | Magee | | 375/267 |
| 2006/0203925 A1 * | 9/2006 | Pirooz et al. | | 375/260 |
| 2007/0149135 A1 * | 6/2007 | Larsson et al. | | 455/67.13 |
| 2008/0107194 A1 * | 5/2008 | Cho et al. | | 375/260 |
| 2008/0310565 A1 * | 12/2008 | Abbott et al. | | 375/348 |

FOREIGN PATENT DOCUMENTS

| EP | 1424789 A1 | 6/2004 |
|---|---|---|
| EP | 1575207 A2 | 9/2005 |
| EP | 1675340 A1 | 6/2006 |

OTHER PUBLICATIONS

International Search Report—PCT/US2010/020286—International Search Authority—European Patent Office, Apr. 8, 2010.

* cited by examiner

*Primary Examiner* — Khanh C Tran
(74) *Attorney, Agent, or Firm* — Qualcomm Patent Group; James H. Yancey, Jr.

(57) ABSTRACT

A method is provided to generate preamble sequences. The method includes transmitting a periodic set of samples as part of a wireless communications preamble sequence and determining a set of null periods in which zero samples are transmitted. The null periods are interspersed among the periodic set of samples in order to enhance correlation efficiency and mitigate processing complexity.

30 Claims, 11 Drawing Sheets

PREAMBLE SEQUENCES FOR WIRELESS COMMUNICATION SYSTEMS

BACKGROUND

I. Field

The following description relates generally to wireless communications systems, and more particularly to preamble sequence transmissions that improve noise performance and mitigate processing complexity.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

One common application in wireless systems is in regard to transmission of preamble sequences. Generally, the desired sequence is transmitted along with a reference sequence that is employed to adequately decode the desired sequence in the presence of noise. In general, the longer the sequence and reference sequence, the better a receiver can discriminate from the noise. Unfortunately, as preamble sequences are increased, processing complexity and resources required at the receiver ends is increased substantially.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to enhance correlation performance of wireless communications systems while mitigating the processing complexities of such systems. Wireless preamble sequences are enhanced by placing or interspersing null periods within or among transmitted samples that communicate the respective sequences. The null periods can be viewed as time periods where little or no information is transmitted. By placing the null periods (or zero's) between the transmitted samples, correlation efficiency is enhanced since signal ambiguity in the presence of noise is reduced when correlation is performed at the receiver. In contrast to conventional systems that employ large preamble sequences to ensure desired noise performance during correlation, the interspersed null periods also reduce receiver processing complexity since desired correlation performance can be achieved by utilizing fewer samples. Thus, when fewer samples are transmitted, less processing is ultimately required by the receiver during sample decoding. In another aspect, as transmitted samples are reduced, transmitter power can be increased accordingly to compensate for the reduced set in a non-hierarchical setting. In yet another aspect, and in addition to enhancing correlation performance, the null periods or zero's can be adjusted to actually communicate desired information between nodes. For instance, utilizing the number of zero's between samples to communicate a network ID or other information.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate efficient cross-correlation of digital sequences. In one aspect, a method is provided to generate preamble sequences. The method includes transmitting a periodic set of samples as part of a wireless communications preamble sequence and determining a set of null periods in which zero samples are transmitted. The null periods are interspersed among the periodic set of samples in order to enhance correlation efficiency and mitigate processing complexity. Since the signal preceding a preamble sequence is often a quiet period with no transmission (i.e., zeros), therefore the scheme with interspersed zeros automatically provides enhanced auto-correlation properties.

Figure 1:
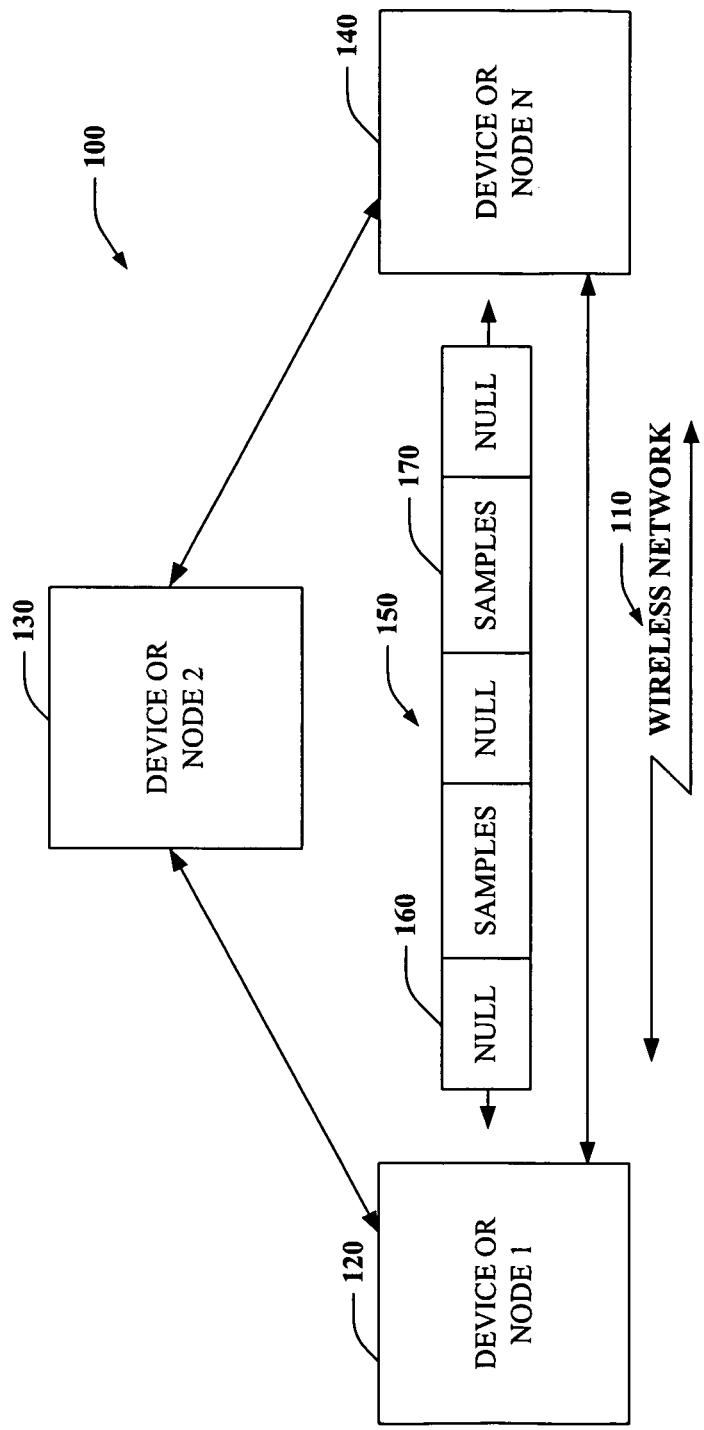
FIG. 1 is a high level block diagram of a system that employs enhanced preamble sequences to facilitate correlation across a wireless network.

Referring now to FIG. 1, a system 100 employs enhanced preamble sequences to facilitate correlation across a wireless network 110. The system 100 includes two or more devices or nodes 120-140 that communicate across the wireless network 110. The device or node can be a base station (also referred to as evolved node B or eNB) which can be an entity capable of communication over the wireless network 110 to a second device or node 120-140. For instance, a device 120-140 can be an access terminal (also referred to as terminal, user equipment, or mobile device). As shown, each of the respective devices or nodes 120-140 are capable of generating, receiving, and processing a preamble sequence 150 that includes one or more null periods and one or more sets of samples 170.

In general, the preamble sequence 150 is provided to enhance correlation performance of wireless communications systems 100 while mitigating the processing complexities of such systems. Wireless preamble sequences 150 are enhanced by placing or interspersing the null periods 160 within or among transmitted samples 170 that communicate the respective sequences. The null periods 160 can be viewed as time periods where little or no information is transmitted. By placing the null periods 160 (or zero's) between (or among) the transmitted samples 170, correlation efficiency is enhanced since signal ambiguity in the presence of noise is reduced when correlation is performed at the receiver (nodes 120-140 receiving the sequence 150).

In contrast to conventional systems that employ large preamble sequences to ensure desired noise performance during correlation, the interspersed null periods 160 also reduce receiver processing complexity since desired correlation performance can be achieved by utilizing fewer samples 170 (e.g., reducing from 128 samples in a set to 32 samples in a set). Thus, when fewer samples in a set 170 are transmitted, less processing is ultimately required by the receiver during sample decoding. In another aspect, as transmitted samples are reduced, transmitter power can be increased accordingly to compensate for the reduced set in a non-hierarchical setting. In yet another aspect, and in addition to enhancing correlation performance, the null periods 160 or zero's can be adjusted to actually communicate desired information between nodes 120-140. For instance, utilizing the number of zero's between samples to communicate a network ID or other information.

From a high level, the system 100 supports various methods. In one aspect, a method to generate preamble sequences is provided that includes transmitting a periodic set of samples 170 as part of a wireless communications preamble sequence 150. This includes determining a set of null periods 160 in which zero samples are transmitted and interspersing the null periods among the periodic set of samples in order to enhance correlation efficiency and mitigate processing complexity. The number of nulls or zero's 160 is optimally set to N−1 the number of samples, where N is an integer. It is to be appreciated however that other null amounts can also be utilized. For example, the number of null periods 160 can be set equal to or greater than the number of samples 170. In a specific example, the number of samples 170 is set to 32 and thus a number of nulls or zero's could be set to 31. The number of samples can also be transmitted and decoded as part of a hierarchical sequence as will be described in more detail below.

Other methods include transmitting at least two sets of samples 170 and at least two null periods 160 within one OFDM symbol, for example. This can include quantizing at least three levels of information when processing the periodic set of samples, where the three levels of information include zero, one, and minus one, for example. In another aspect, the methods include reducing the amount of samples 170 while boosting transmitter power at the nodes or devices 120-140 when sending the reduced amount of samples. Such configurations can be employed in non-hierarchical arrangements if desired. For example, the method can reduce the amount of samples 170 by four times in some case while correspondingly boosting the transmitter power by four times. It is to be appreciated that transmit power increase do not have to be equally correlated to the number of reduction in samples 170 however.

In yet another aspect, the null periods 160 can be utilized to convey information. For example, use 31 zero's at 160 to communicate a first message or 32 zero's to communicate a second message at 160 and so forth. For instance, the null periods 160 could indicate a network identifier (ID) or other parameter such as the number of the network that a device or node 120-140 desired to communicate with. Other methods further include reducing side lobes by employing convex optimization. These can include optimizing the preamble sequence 150 according to a hierarchical sequence and/or maintaining a flat spectrum across the sequence while rotating angles, for example. This can also include applying dither to the preamble sequence 150 to cause side lobes to shift in position and value from one OFDM symbol to another.

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
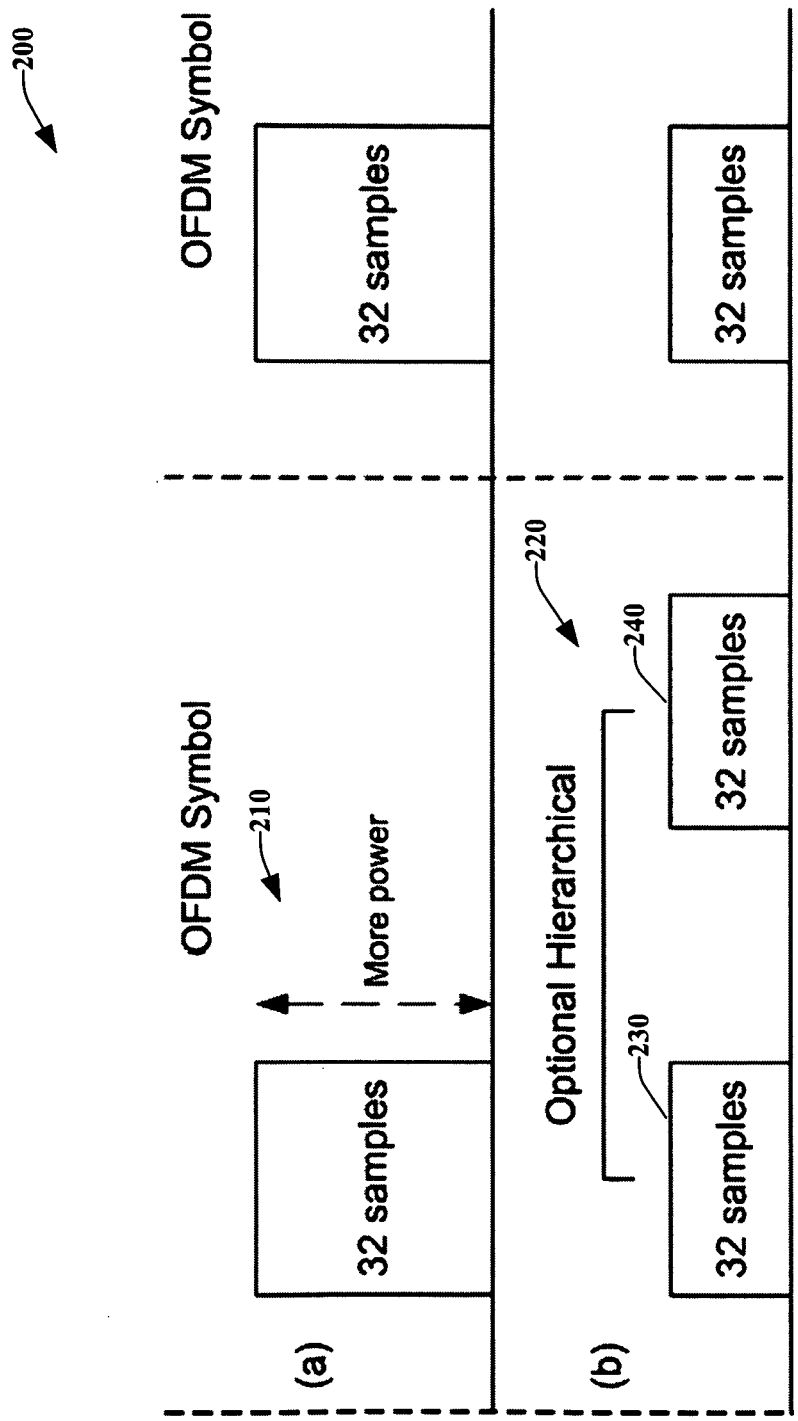
FIG. 2 is a signal diagram that illustrates example wireless preamble sequences.

Turning to FIG. 2, a signal diagram 200 illustrates example wireless preamble sequences. At 210 of the diagram 200, a reduced sample size of 32 samples is transmitted for a non-hierarchical system. Note that transmitter power is increased by about $\frac{1}{4}^{th}$ for the reduced sample set in order to mitigate noise effects of transmitting a smaller sequence (e.g., 32 instead of 128 samples). At 220, a hierarchical preamble sequence is illustrated. In this aspect, sample sets at 230 and 240 respectively, are preceded and followed by null packets or zeros. As will be described in more detail below with respect to FIGS. 3 and 4 (also see discussion for details of following symbols and equations), spectrums of A(f) and B(f) should be as flat as possible for suitable auto-correlation properties. In one aspect, the spectrum can be flattened by setting $a_k$ to a Dirac impulse (sequence of length one) and therefore A(f) is flat. Then, utilize a long lengthy $b_k$ to flatten as much as possible B(f) albeit not too long in order to maintain the total number of operations as small. One simple structure uses a $b_k$ of length 32 samples as shown at 210 and 220. Quantize to 3 levels (0, +/−1) and search for sequences of length 32 that have near flat spectrum. The final $c_k$ is a 32 long sequence with higher power. It is surrounded by zeros and can have very good auto-correlation. It is possible to use 2 such sequences within one OFDM symbol, separated by at least 32 zeros, for example which is equivalent to a sequence $a_k$ with two Diracs. The sign of the taps in $a_k$ are randomized or optimized to improve overall spectrum.

In another aspect, side lobes of the auto-correlation can be pushed down by convex optimization, at least around the main lobe. Far away lobes are generally less impeding. Equal but weaker side lobes are more forgiving and better for a worst case channel design. Also, optimize transmitted preambles to better fit hierarchical sequences (weaker side lobes) by maintaining a flat spectrum while rotating angles. This can also include dithering transmitted preambles so that the side lobes shift in position and value from one OFDM symbol to next one. It also helps worst case channels by creating diversity.

Figure 3:
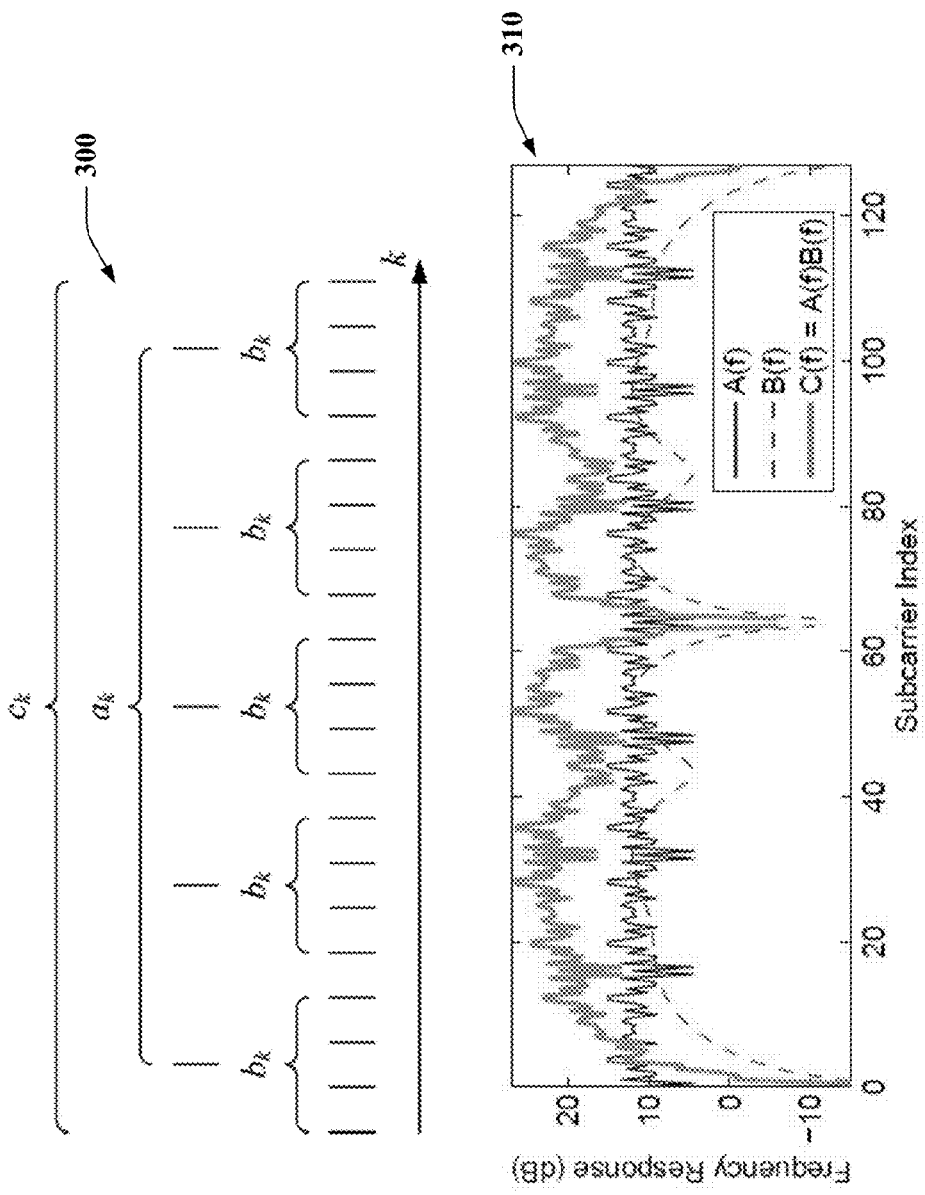
FIGS. 3 and 4 illustrate example signal considerations for wireless preamble sequences.
Figure 4:
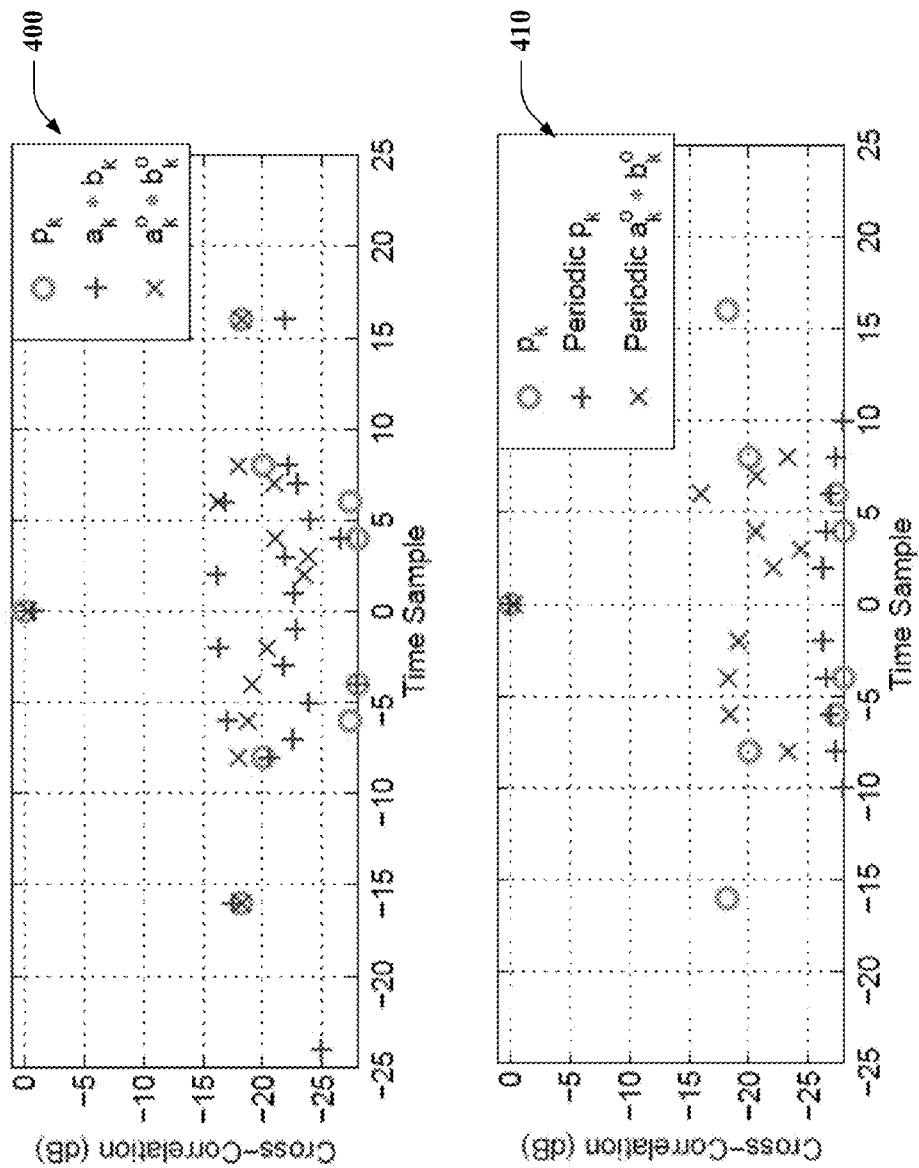

Referring to FIGS. 3 and 4, various aspects of cross-correlation and generating preamble sequences are described. FIGS. 3 and 4 are described within the context of the following discussion. In general, wireless systems are concerned with estimating a channel or detecting the presence of a packet in time domain. A digital sequence $p_k$ is transmitted that stimulates the channel. The received sequence is convolved with the channel plus additive noise, $y_k = p_k * h_k + n_k$. Note that this model can be viewed as unknown information $h_k$ that propagates through a known channel $p_k$. It can be written in matrix form: $Y = P_t H + N$, where the quantities, except for $P_t$, are column vectors consisting of concatenating corresponding samples from a window large enough to ensure the entire channel information is captured. Thus, $P_t$ is a Toeplitz matrix of the sequence $p_k$. The Least Squares (LS) estimate of the unknown channel H (which is the same as the Maximum Likelihood (ML) estimate when the noise is AWGN) is $\hat{H} = (P_t^H P_t)^{-1} P_t^H Y$.

Applying the matrix $(P_t^H P_t)^{-1}$ is prohibitively expensive when scanning sample by sample for the presence of a packet. Unless sequence $p_k$ has a particular structure: indeed, matrix $P_t$ is a Toeplitz matrix of the auto-correlation function of $p_k$. When the auto-correlation is a Dirac impulse, or nearly with very weak side lobes, then $(P_t^H P_t)$ is proportional to an identity matrix and can be dropped, which leaves the common algorithm of cross-correlating the received signal with the transmitted sequence, $\hat{h}_k = p^*_{-k} * p_k * y_k = h_k + p^*_{-k} * n_k$.

Note that in the presence of one or two side lobes, the inverted matrix is sparse and it is feasible to apply this correction. Also note that, even if $(P_t^H P_t)^{-1}$ were applied, it can be shown that the optimal estimation of $h_k$ is obtained when $(P_t^H P_t)$ is proportional to the identity matrix. Detecting the presence of a packet is usually performed by estimating channel $h_k$ for every sample position, and checking the total energy of the channel against the noise energy. Above a certain threshold, a packet is declared present. In general, it is important to find digital sequences with Dirac-like auto-correlation properties in order to estimate the channel or detect the presence of a packet. The following discussion relates to cross-correlation.

The cross-correlation of two digital sequences $p_k$ and $q_k$ is given by $$r_k = \sum_{k'=-\infty}^{+\infty} p_{k'} + k q^*_{k'} \equiv p^*_k q^*_{-k'}$$

where * denotes linear convolution. In frequency domain it can be expressed as $R(f) = P(f) Q^*(f)$, where R(f), P(f), and Q(f) are respectively the Fourier transforms of $r_k$, $p_k$ and $q_k$. Since digital sequences are involved, the frequency domain is band limited to the frequency region [−0.5, 0.5]. Using the inverse Fourier transform, then:

$$r_k = \int_{-0.5}^{0.5} P(f) Q^*(f) e^{j2\pi fk} df.$$

If the time domain sequences $p_k$ and $q_k$ are also periodic of period L samples, then the frequency domain can be sampled at regular interval 1/L, and fully represented by L samples. This can be denoted by $R_l$, $P_l$ and $Q_l$ the sampled versions. For periodic $p_k$, infinite linear convolution can be replaced with one-period circular convolution, denoted by ⊛. The expressions for periodic sequences become:

$R_l + P_l Q_l^*$ $r_k + p_k \circledast q^*_{-k}$ $$r_k = \sum_{l=0}^{L-1} P_l Q_l^* e^{j2\pi lk}$$

If the sequences are not periodic but each is limited in duration to L samples (and is zero outside that duration), then the cross-correlation is limited to a duration of 2L samples. Therefore, using the dual of the Nyquist theorem in time domain, the frequency domain can be sampled at a rate of ½L, or in other words, periodically repeat the time domain every 2L samples. It is enough to consider a total of 2L samples in frequency domain to represent the cross-correlation. When $q_k=p_k$, the cross-correlation is an auto-correlation. The formulas become:

$$R_l = |P_l|^2 \triangleq S_l$$

$$r_k = p_k \circledast p^*_{-k}$$

$$r_k = \sum_{l=0}^{L-1} S_l^* e^{j2\pi lk}$$

$S_l$ is the spectral density (or spectrum) of sequence $p_k$. The non-sampled version is denoted by S(f). Since $r_k$ is the inverse Fourier transform of $S_l$, suitable auto-correlation properties are obtained when $S_l$ is flat: spectrum flatness results in Dirac-like auto-correlation (e.g., side lobes at $-\infty$ dB). There is an exception: if time domain sequences are effectively shorter and hence $S_l$ is oversampled, in which case it is enough to consider the non-oversampled version.

Note that S(f) is an oversampled version of $S_l$ and does not convey any additional information (besides prolonging the time domain period by padding with more and more zeros). Generally, suitable auto-correlation properties of sequence $p_k$ imply a flat amplitude $|P_l|$, while the phase can take on substantially any values. The phase is usually tweaked to ensure low peak-to-average ratio and low loss quantization in time domain. For non-periodic sequences, two times the length can be considered by padding with zeros. The following discussion now relates to hierarchical preamble sequences.

The hierarchical structure of the preamble sequence essentially implies that it is constructed as the convolution of 2 sequences, $c_k=a_k*b_k$, where $b_k$ is a short sequence sampled at normal rate, and $a_k$ is a long but under-sampled sequence (it has narrower frequency bandwidth) as in diagram 300 of FIG. 3. The sequences can be viewed as trains of impulses, and in the case of $a_k$ the impulses are spaced far enough to fit sequence $b_k$ in-between. The TFC1 of WiMedia consists of the two sequences $$A+(1,1,1,1,-1,-1,1,-1,1,-1,1,1)^T$$

$$B+(1,-1,-1,-1,1,1,-1,1)^T$$

where $b_k$ is sequence B, and $a_k$ is sequence A with e.g., 8 zeros inserted in-between each sample to form the sparse sequence. Zeros are padded as needed. Note that A and B can also be viewed as two column vectors. This vector form will be used in the following discussions.

The final sequence is $c_k$. A continuous cross-correlation of a received signal $y_k$ with reference $c_k$ is equivalent to $c^*_{-k}*Y_k=a^*_{-k}*b^*_{-k}*Y_k$. Hence, first convolve with $b^*_{-k}$ and then convolve with $a^*_{-k}$. By dividing the problem into two very short convolutions, a large number of multiplications or operations can be saved. In WiMedia's case, convolving directly with $c_k$ involves 128 complex multiplications per sample. The two successive convolutions involve 16+8=24 complex multiplications per sample. A well designed $c_k$ sequence has an auto-correlation with exceedingly weak side lobes. The autocorrelation of WiMedia's sequences has relatively strong side lobes. In order to save multipliers, the sequences are usually quantized to 2 or 3 levels, which add further constraints on the sequences.

Since WiMedia's sequences are not periodic, consider a total length of 2*128=256 samples by padding the sequences with zeros. The frequency domain is also sampled to 256 samples. In frequency domain, one can write:

C(f)+A(f)B(f), where A(f), B(f), and C(f) are respectively the Fourier transforms of $a_k$, $b_k$ and $c_k$. The variable f is used rather than index l for better clarity, but it is implicitly assumed that the frequency domain is sampled to 256 samples. Sequence $b_k$ is short and hence B(f) varies slowly. On the other hand, $a_k$ is under sampled and hence A(f) has narrower bandwidth and repeats periodically as shown at diagram 310 of FIG. 3.

A flat spectrum for suitable auto-correlation properties implies that A(f) and B(f) have to be as flat as possible (there is an exception: if oversampled by having shorter time periods). It is clear from diagram 310 of FIG. 3 that this is not the case. The limitation to 2 quantization levels+/−1 reduces the options for $a_k$ and $b_k$. The sequence $c_k$ is not the transmitted sequence in WiMedia. The transmitted sequence $p_k$ is obtained after flattening of the spectrum by rounding the amplitude to a constant value while keeping the same phase. At DC and band edges, a rounding to zero amplitude is performed. A reason for rounding the amplitude is to better meet the spectral density requirement of the standard. However, the rounding is only performed at 128 frequency bin centers. If considering the 2× oversampled spectrum with 256 total samples, the values in-between subcarriers are not rounded to constant amplitude. They cannot be rounded because they are interpolated values: the sequence length is fixed to 128 in time domain, i.e., it can only be padded with zeros, hence the interpolation.

The non-flat 2× oversampled spectrum means the sequence $p_k$ does not have optimal auto-correlation properties. The autocorrelation function of $p_k$ is shown at diagram 400 of FIG. 4. It has relatively strong side lobes at −18 dB. The cross-correlation of $p_k$ with $c_k=a_k*b_k$, is a little worse: it has a main lobe at −0:8 dB below $p_k$'s main lobe, and side lobes at −15 dB below that. Most receivers will perform this cross-correlation in order to save multipliers and adders. Performance degradation can be expected as a result of the strong peaks.

After modifying $c_k$ into $p_k$ by rounding the spectrum to constant amplitude, is it possible to find better sequences ak and bk? Generally, the answer is yes, at least if floating point precision is employed. Now, utilize the vector forms A and B given above. Also form the 8×16 matrix C by reshaping the sequence $c_k$. Fill out the matrix column-wise, $$C \triangleq \begin{pmatrix} c_0 & c_8 & \ldots & c_{120} \\ c_1 & c_9 & \ldots & c_{121} \\ \ldots & \ldots & \ldots & \ldots \\ c_7 & c_{15} & \ldots & c_{127} \end{pmatrix}$$

It can be verified that $c_k=a_k*b_k \Leftrightarrow C=BA^T$. Thus, in a similar way that shaped sequence $c_k$ into matrix C, one can shape transmitted sequence $p_k$ into 8×16 matrix P. Now the problem is to find two new sequences $\hat{A}$ and $\hat{B}$, i.e., $\hat{a}_k$ that minimize the distance $\min \|pk-\hat{a}_k*\hat{b}_k\|^2 = tr\|P-\hat{B}\hat{A}^T\|^2$. Minimizing this distance is equivalent to maximizing cross-correlation, and generally leads to weaker side lobes. The solutions are proportional to the Strongest Eigen Vectors (SEV):

$$\hat{A}^T \propto SEV\, p^H p$$

$$\hat{B} \propto SEV\, pp^H$$

Diagram 400 of FIG. 4 shows the cross-correlation of $p_k$ with $\hat{a}_k*\hat{b}_k \triangleq a_k^\circ * b_k^\circ$. The new sequences are floating point sequences and outperform the original $a_k$ and $b_k$. However, quantizing them to 2 or 3 levels yield the original $a_k$ and $b_k$. Quantizing them to 5 levels (0, +/−1, +/−2) yields improved results with little additional hardware (multiplying by 2 is equivalent to a shift by 1 bit and is implemented as a multiplexer).

As noted above, the transmitted sequence $p_k$ has a flat spectrum at the subcarrier centers (except for DC and band edges). Although the non-periodic version does not perform as well because the 2× oversampled spectrum is non-flat, if one were to periodically repeat $p_k$ then one should observe a better auto-correlation. For a periodic version, the flat 1× spectrum matters (DC and band edges are the remaining imperfections).

A question is whether there is a technique to emulate periodicity and push down the side lobes. One technique is similar to the Overlap-And-Add (OAA) operation used for the Zero-Padded (ZP) region of each OFDM symbol. When the timing is coarsely known (e.g., when calculating fine timing synchronization, or carrier frequency offset, and so forth), then the problem is straight-forward. Apply OAA as with ZP. Depending on the coarse timing, one may need to apply it in two directions: backward and forward in order to cover missing pieces of the sequence from different channel tap delays. Noise is added in the process but is relatively weak (1 dB). The diagram 410 of FIG. 4 shows the improved auto-correlation for a periodic $p_k$.

When the timing is unknown and the system is indefinitely scanning to detect the presence of a packet, it is expensive to perform an OAA operation at every sample position. It can be achieved it in a cheaper way but that increases noise variance by 3 dB. Periodicity can be emulated by convolving with an additional sequence of length 129 samples, $\alpha_k = (1, 0, 0 \ldots, 0, 0, 1)$. The sequence contains two Dirac impulses 128 samples apart. One can write $z_k = \alpha_k * y_k = \alpha_k * Pk^{*h} k + \alpha_k * n_k$.

The new signal is $z_k$ obtained by convolving the received signal with $\alpha_k$, which requires one addition per sample. The noise is enhanced by 3 dB, however, the channel $h_k$ is now stimulated by a sequence repeated twice. When cross-correlating as usual with $p_k$, one can observe two versions of the channel, one of them cleaner since sequence $p_k$ has better auto-correlation properties if repeated. On the other hand, sequence $a_k * b_k$ does not have suitable properties if repeated and there is substantially no gain in emulating periodicity when cross-correlating with the latter.

Figure 5:
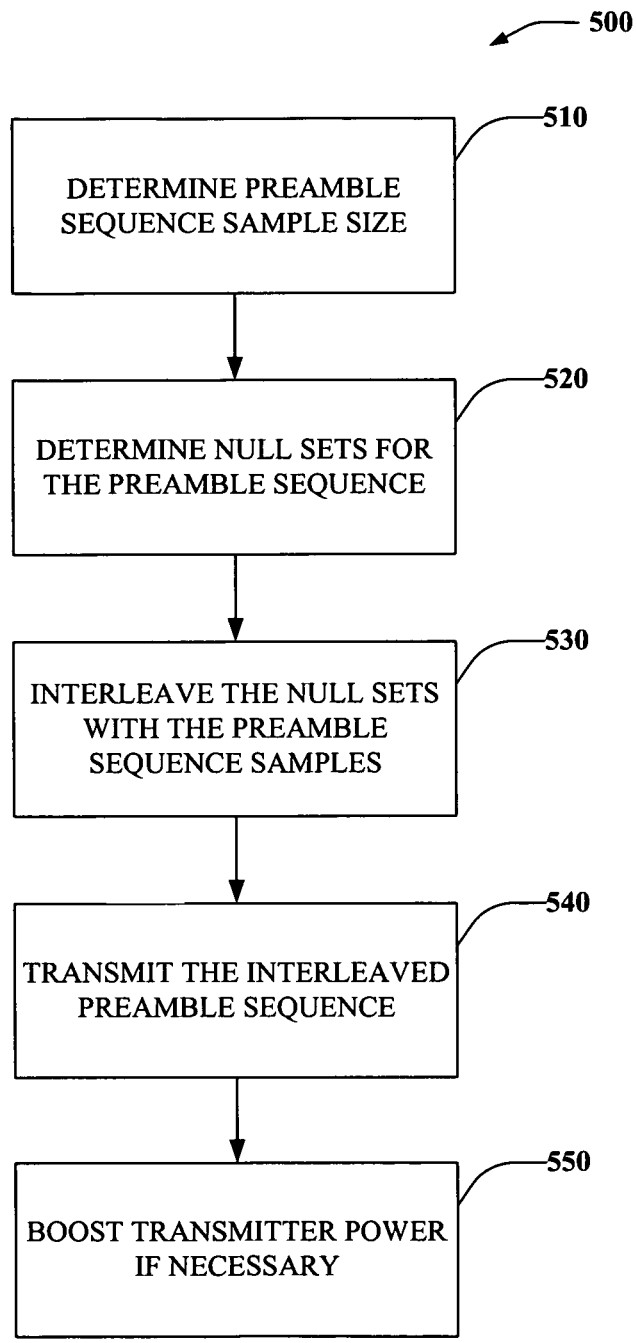
FIG. 5 illustrates a wireless communications method that utilizes a preamble sequence to facilitate correlation and mitigate processing of wireless data.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, preamble sequence sample sizes are determined. As noted previously, longer sequences were conventionally used such as 128 samples per set. In this aspect a smaller number such as 32 or less is selected. At 520, null or zero sets are determined for the respective sample size selected. Typically, the number of nulls or zeros selected is N−1, where N is an integer. Thus, if 32 samples are selected at 510, 31 zeros can be configured and generated at 520. It is to be appreciated however that null set sizes other than N−1 can be employed. At 530, the null sets determined at 520 are interleaved with the samples determined at 510. Generally, interleaving implies alternating sample sets with null or zero valued data sets. At 540, the interleaved preamble sequence is transmitted at 540 will the sequence will be subsequently received and processed by a wireless receiver during cross-correlation operations which are described in more detail below. At 550, transmitter power can be optionally boosted to coincide with the reduced number of samples in the preamble sequence. Transmitter boosting is typically employed when noon-hierarchical sequences are generated. It is to be appreciated however that transmitter power boosting can also occur during hierarchical sequences as well, if desired.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
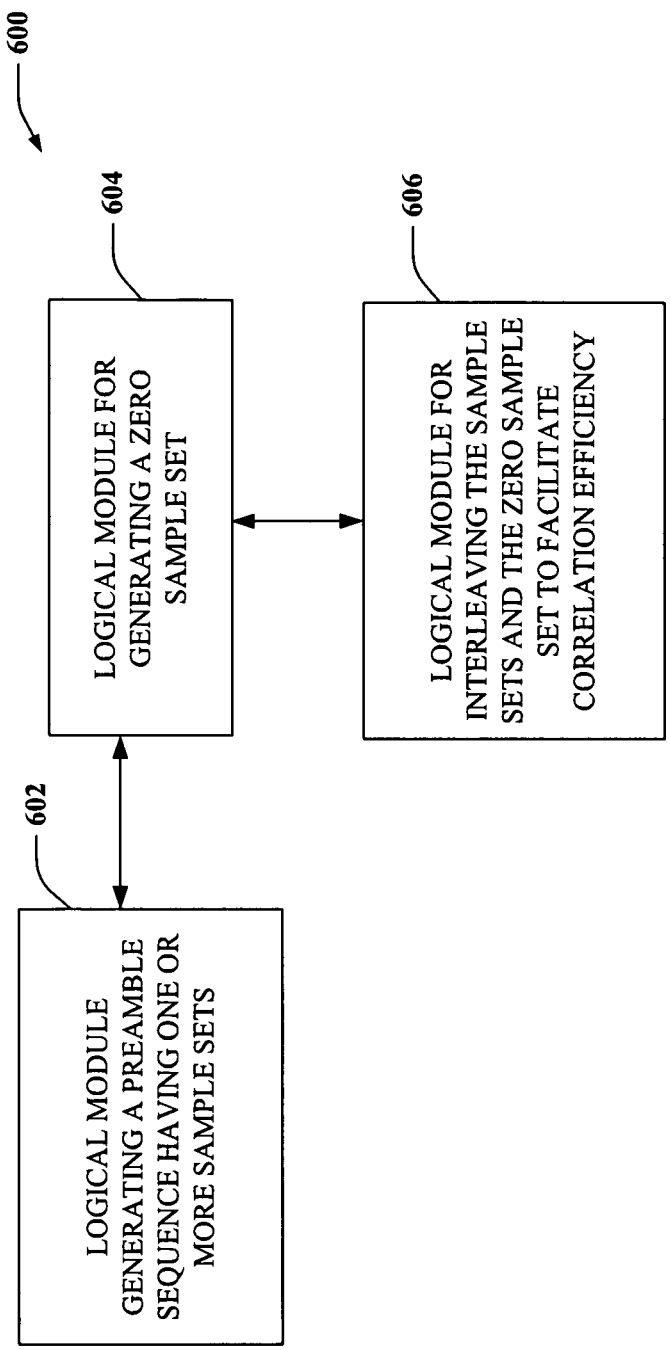
FIG. 6 illustrates an example logical module for a preamble sequence.
Figure 7:
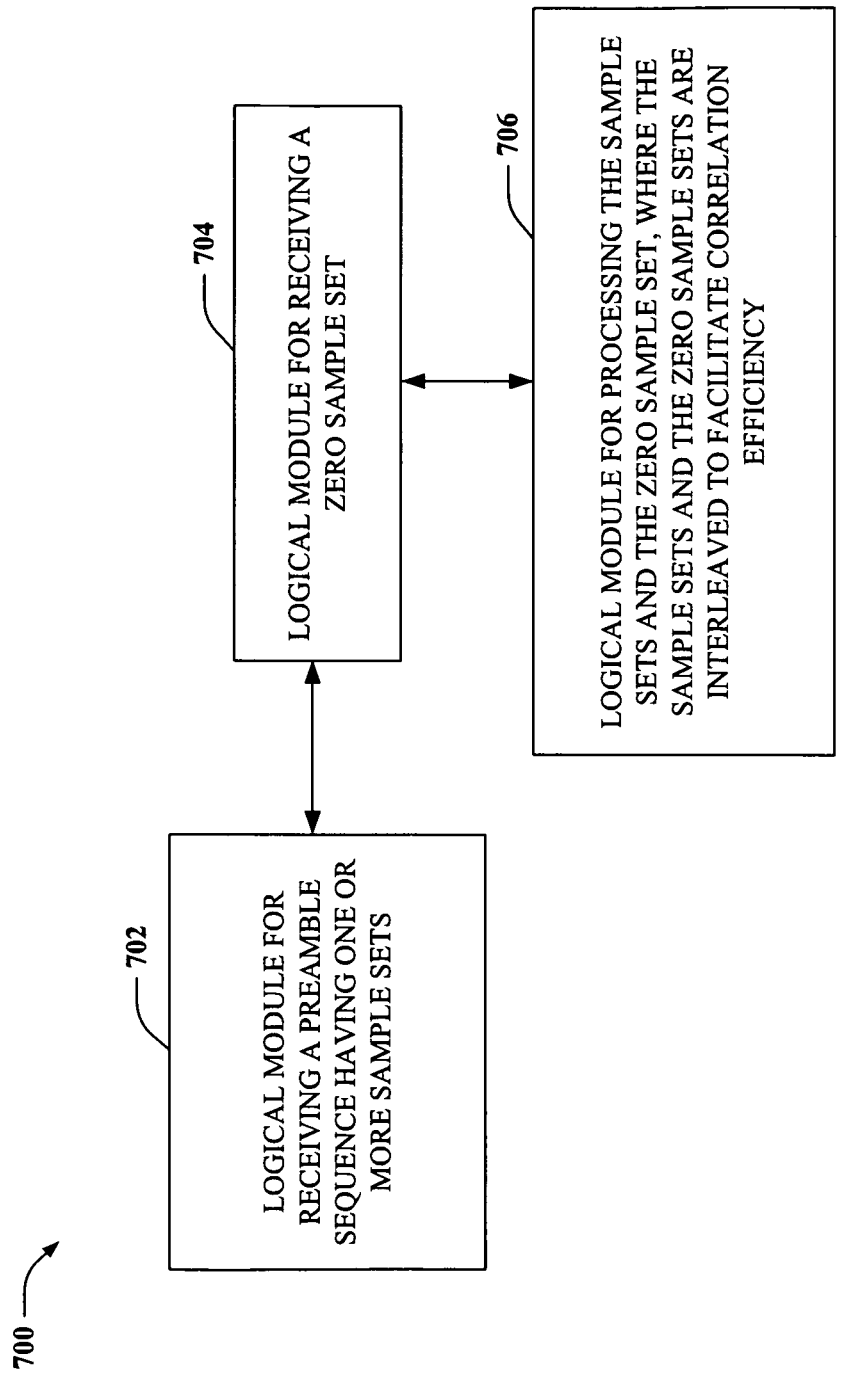
FIG. 7 illustrates an example logical module for an alternative preamble sequence.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for generating a preamble sequence having one or more sample sets and a logical module 604 for generating a zero sample set. The system 600 also includes a logical module 606 for interleaving the sample sets and the zero sample set to facilitate correlation efficiency.

Referring to FIG. 7, a wireless communication system 700 is provided. The system 700 includes a logical module 702 for receiving a preamble sequence having one or more sample sets and a logical module 704 for receiving a zero sample set. The system 700 also includes a logical module 706 for processing the sample sets and the zero sample set, where the sample sets and the zero sample sets are interleaved to facilitate correlation efficiency.

Figure 8:
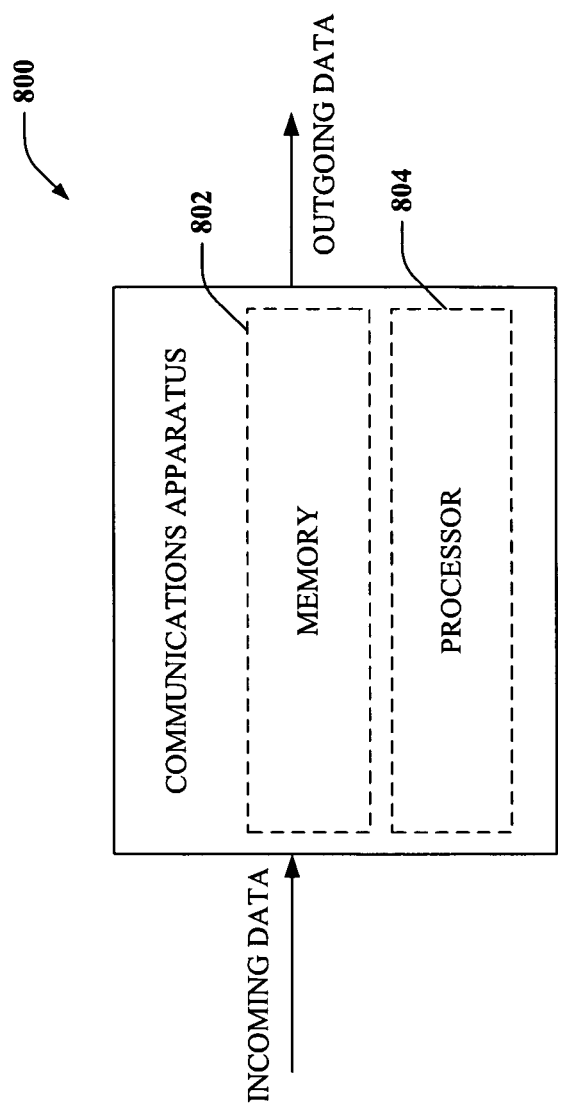
FIG. 8 illustrates an example communications apparatus that employs preamble sequences.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
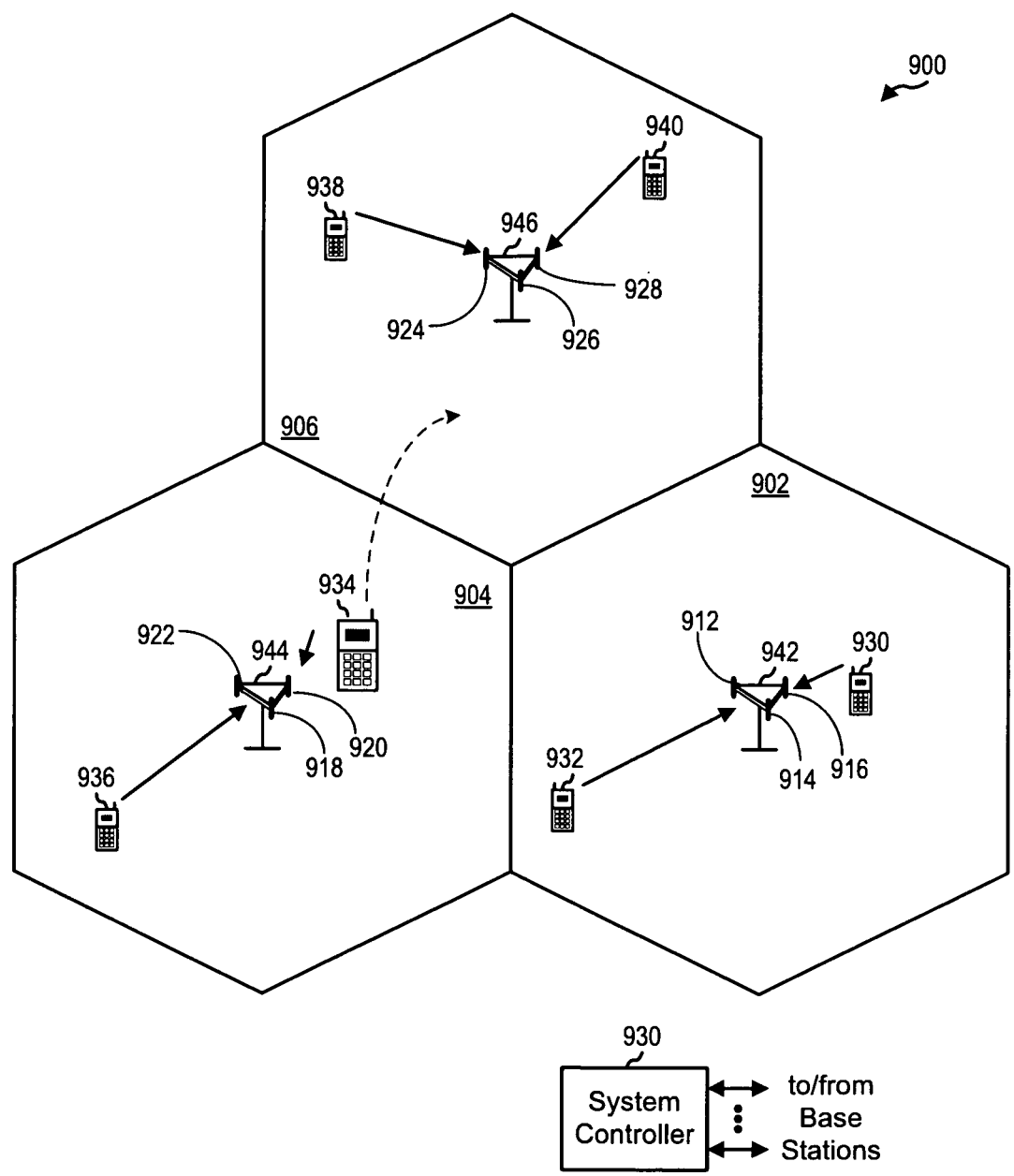
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
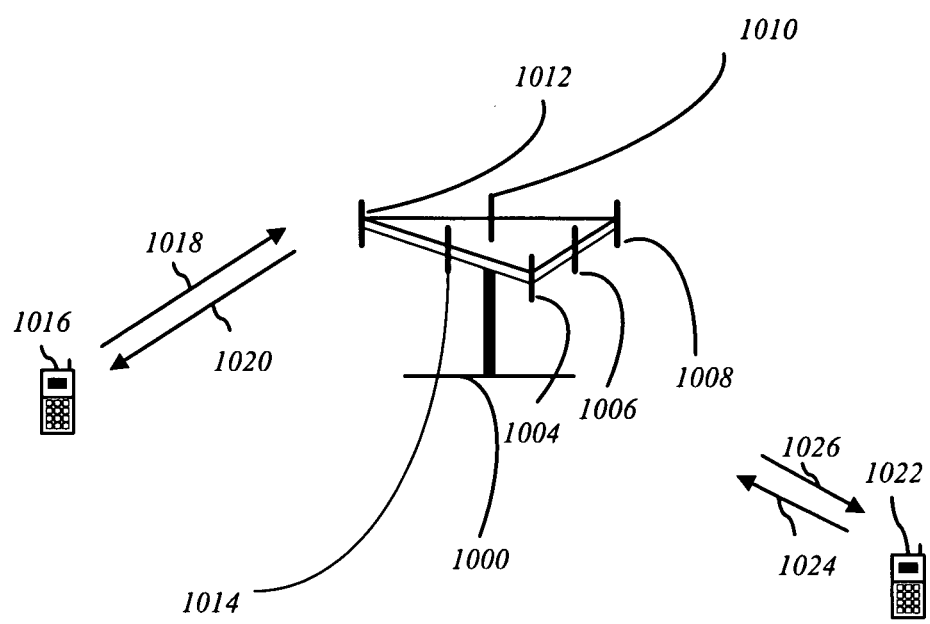
FIGS. 10 and 11 illustrate example communications systems that can be employed with preamble sequences.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
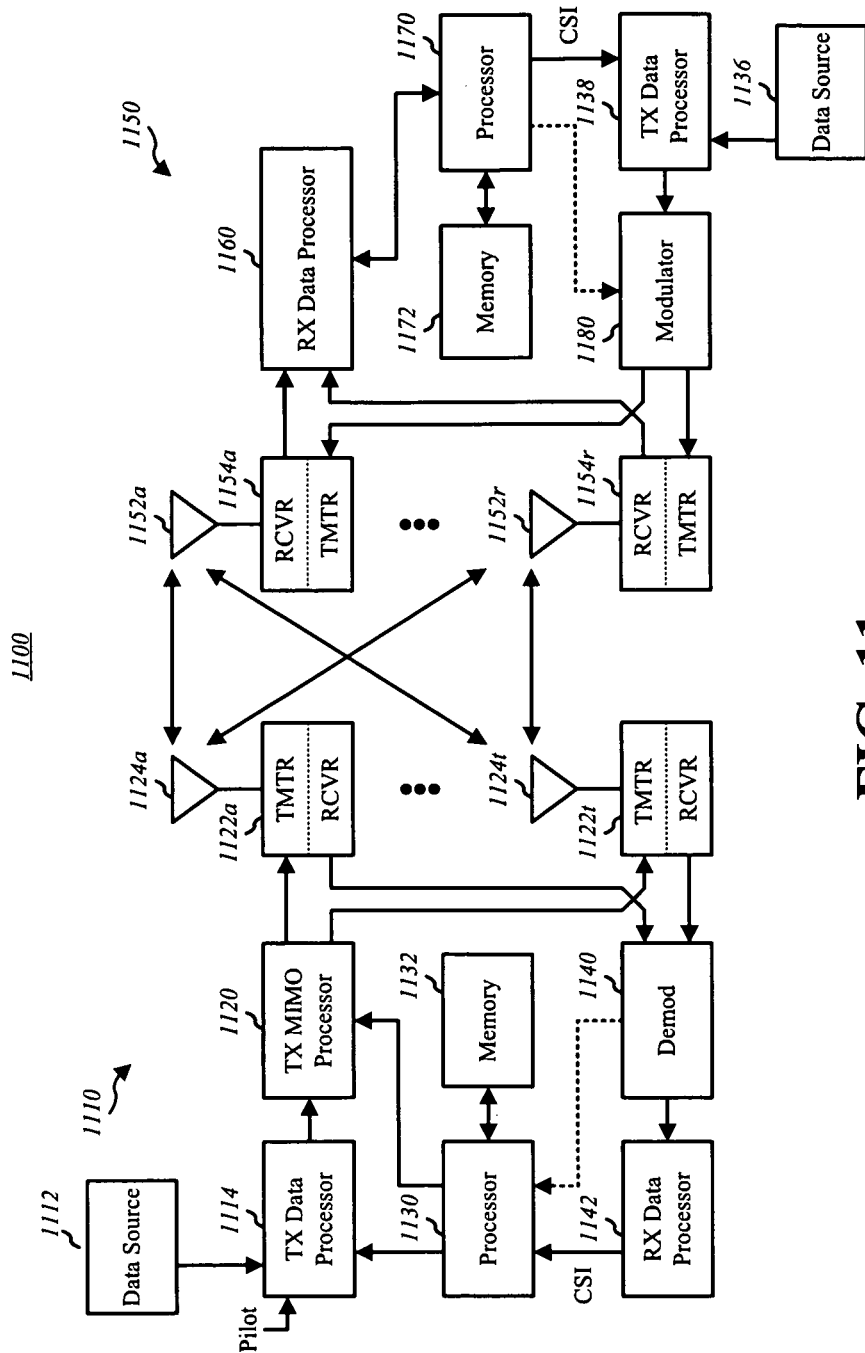

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to generate preamble sequences, comprising:
    determining a periodic set of samples to transmit as part of a wireless communications preamble sequence;
    reducing an amount of samples of the periodic set of samples;
    determining a set of null periods to convey a network identifier (ID) in which zero samples are transmitted;
    interspersing the null periods among the reduced set of periodic samples in order to enhance correlation efficiency and mitigate processing complexity; and
    boosting transmitter power when transmitting the reduced samples.

2. The method of claim 1, the number of null periods is set to N−1 the number of samples, where N is an integer and N is greater than one.

3. The method of claim 1, the number of null periods is set equal to or greater than the number of samples.

4. The method of claim 3, the number of samples is set to 32.

5. The method of claim 4, the number of samples is transmitted as part of a hierarchical sequence.

6. The method of claim 1, further comprising transmitting at least two sets of samples and at least two null periods within one OFDM symbol.

7. The method of claim 6, quantizing at least three levels of information when processing the periodic set of samples.

8. The method of claim 7, the three levels of information include zero, one, and minus one.

9. The method of claim 1, further comprising:
    reducing the amount of samples by four times; and
    boosting the transmitter power by four times.

10. The method of claim 1, further comprising utilizing the null periods to convey information.

11. The method of claim 1, further comprising transmitting data to a network indicated by the network ID.

12. The method of claim 1, further comprising reducing auto-correlation side lobes by employing convex optimization.

13. The method of claim 1, further comprising:
    optimizing the preamble sequence according to a hierarchical sequence; and
    maintaining a flat spectrum across the sequence while rotating angles.

14. The method of claim 1, further comprising applying dither to the preamble sequence to cause side lobes to shift in position and value from one OFDM symbol to another.

15. A communications apparatus, comprising:
    a processor;
    a memory in electronic communication with the processor, the memory storing computer executable instructions that when executed by the processor cause the processor to:
    generate one or more preamble sequence sample sets;
    reducing an amount of samples of the generated preamble sequence sample sets;
    generate one or more zero data sets to convey a network identifier (ID);
    mix the one or more zero data sets between the preamble sequence sample sets to enhance correlation efficiency; and
    boost transmitter power when transmitting the reduced samples.

16. The apparatus of claim 15, the zero data sets is adjusted to N−1 the number of sample sets, where N is an integer and N is greater than one.

17. The apparatus of claim 16, the number of zero data sets is set equal to or greater than the number of samples.

18. The apparatus of claim 15, further comprising utilizing the zero data sets to convey information.

19. A communications apparatus, comprising:
    means for generating a preamble sequence having one or more sample sets;
    means for reducing an amount of sample sets of the generated preamble sequence;
    means for generating a zero sample set to convey a network identifier (ID);
    means for interleaving the sample sets and the zero sample set to facilitate correlation efficiency; and
    means for boosting transmitter power when transmitting the reduced sample sets.

20. A non-transitory computer-readable storage device storing computer executable instructions that when executed by a processor cause the processor to:
    generate a preamble sequence having one or more sample sets;
    reduce an amount of sample sets of the generated preamble sequence;
    generate one or more null sample sets to convey a network identifier (ID);
    mix the sample sets and the zero sample sets to facilitate correlation efficiency; and
    boost transmitter power when transmitting the reduced sample sets.

21. A processor that executes the following instructions:
    generating a reduced set of preamble samples;
    generating a set of zero sample sets;
    alternating the preamble samples with the zero sample sets; and boosting power of a transmitter to correlate with the reduced set of preamble samples.

22. A method to process preamble sequences, comprising:
receiving a reduced periodic set of samples as part of a wireless communications preamble sequence, the reduced periodic set of samples being received from a transmitter, the transmitter boosting power to transmit the reduced periodic set of samples;
receiving a set of null periods that conveys a network identifier (ID) in which zero samples are transmitted; and
processing the null periods among the periodic set of samples in order to enhance correlation efficiency and mitigate processing complexity.

23. The method of claim 22, the number of null periods is processed as N−1 the number of samples, where N is an integer and N is greater than one.

24. The method of claim 22, the number of null periods is set equal to or greater than the number of samples.

25. The method of claim 22, further comprising utilizing the null periods to convey information.

26. A communications apparatus, comprising:
a processor;
a memory in electronic communication with the processor, the memory storing computer executable instructions that when executed by the processor cause the processor to:
receive one or more reduced preamble sequence sample sets, the reduced preamble sequence sample sets being received from a transmitter, the transmitter boosting power to transmit the reduced preamble sequence sample sets;
receive one or more zero data sets that convey a network identifier (ID); and
interleave the one or more zero data sets between the preamble sequence sample sets to enhance correlation efficiency.

27. A communications apparatus, comprising:
means for receiving a preamble sequence having one or more reduced sample sets, the reduced sample sets being received from a transmitter, the transmitter boosting power to transmit the reduced sample sets;
means for receiving a zero sample set that conveys a network identifier (ID); and
means for processing the sample sets and the zero sample set, where the sample sets and the zero sample sets are interleaved to facilitate correlation efficiency.

28. A non-transitory computer-readable storage device storing computer executable instructions that when executed by a processor cause the processor to:
receive a preamble sequence having one or more reduced sample sets, the reduced sample sets being received from a transmitter, the transmitter boosting power to transmit the reduced sample sets;
receive one or more null sample sets that convey a network identifier (ID); and
process the sample sets and the null sample sets, where the sample sets and the null sample sets are mixed to facilitate correlation efficiency.

29. A processor that executes the following instructions:
receiving a reduced set of preamble samples, the reduced set of preamble samples being received from a transmitter, the transmitter boosting power to transmit the reduced set of preamble samples;
receiving a set of zero sample sets that conveys a network identifier (ID); and
processing the preamble samples with the zero sample sets as alternating sets.

30. The processor of claim 29, further comprising employing a sign on at least one tap to randomize or optimize a spectrum.

* * * * *